United States Patent

Van Doorn et al.

[11] 3,994,565
[45] Nov. 30, 1976

[54] DEVICE FOR DISPLAYING CHARACTERS HAVING A TWISTED NEMATIC LIQUID CRYSTAL

[75] Inventors: Cornelis Zeger Van Doorn; Johannes Leo Antonius Marie Heldens, both of Eindhoven, Netherlands

[73] Assignee: U.S. Philips Corporation, New York, N.Y.

[22] Filed: June 11, 1975

[21] Appl. No.: 586,062

[30] Foreign Application Priority Data
June 18, 1974 Netherlands............... 7408108

[52] U.S. Cl............................ 350/160 LC; 350/150
[51] Int. Cl.²............................................ G02F 1/13
[58] Field of Search...................... 350/150, 160 LC

[56] References Cited
UNITED STATES PATENTS
3,863,246  1/1975  Trcka et al...................... 340/324 R

*Primary Examiner*—Edward S. Bauer
*Attorney, Agent, or Firm*—Frank R. Trifari; George B. Berka

[57] ABSTRACT

A device for displaying characters on a background of a different color which includes a liquid crystal having a twisted nematic configuration and two sources of polarized light of different colors the directions of polarization of which are at right angles to each other.

1 Claim, 1 Drawing Figure

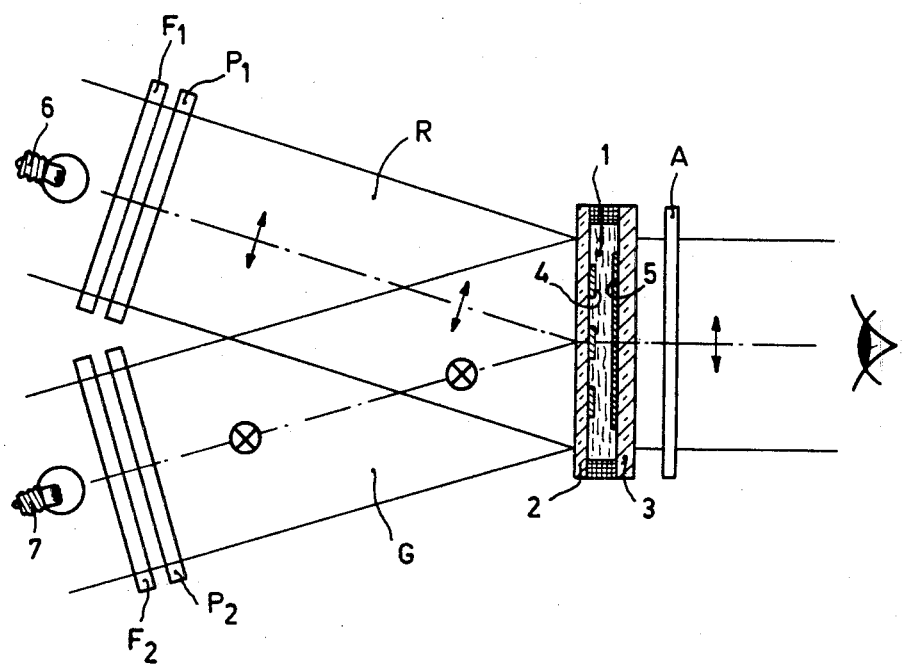

DEVICE FOR DISPLAYING CHARACTERS HAVING A TWISTED NEMATIC LIQUID CRYSTAL

The invention relates to a device for displaying characters having a layer of nematic liquid crystal between two supporting plates, which nematic liquid crystal in the undisturbed state has a twisted configuration, which supporting plates have electrodes for supplying voltages to disturb the said twisted configuration, which device furthermore has an analyser for analysing passed polarised light.

Such a device is known from the article "Low Electrooptic Threshold in New Liquid Crystals" in Proceedings of the I.E.E.E., August, 1972, pp. 1002–1003.

In a layer of nematic liquid crystal the elongate molecules are generally parallel to each other. In a layer of nematic liquid crystal having a twisted configuration the orientation of the elongate molecules rotates through, for example, 90° proceeding from one supporting plate to the other. A device having such a layer is sometimes referred to as a "twistor" and has the property of rotating the direction of polarisation of incident linearly polarised light through 90°. The twisted configuration can be disturbed by means of an electric field across the layer so that the said rotation of the direction of polarisation of incident light disappears. A twistor between polarizers having parallel orientation thus passes no light in the unenergized condition and does pass light in the energized condition. A twistor between polarizers having mutually perpendicular orientation does pass light in the unenergized condition and does not pass light in the energized condition. In this manner light characters can be displayed on a dark background or dark characters can be displayed on a light background by means of a device of the kind mentioned in the preamble.

It is an object of the invention to enable the display of coloured characters on a differently coloured background in view of a better observability and a more handsome aspect of the device.

For that purpose, a device of the kind mentioned in the preamble comprises two sources of linearly polarized light of different colours the directions of polarisation of which are at right angles to each other.

The invention will be described in greater detail with reference to the accompanying drawing which shows the principle of a device according to the invention.

The drawing shows a layer of liquid crystal 1 between two glass supporting plates 2 and 3 which have electrodes 4 and 5. The construction of such a device is known and need not be explained in detail. The layer of liquid crystal has a positive dielectric anisotropy $\Delta\epsilon$ that is to say $\epsilon_{11} - \epsilon_1 > 0$, so that the elongate molecules orient at right angles to the supporting plates 2 and 3 when an electric field of a sufficient value is present between the electrodes 4 and 5. The layer of nematic liquid crystal consists, for example, of p,p'-di-n-butylazoxy benzene, shortly referred to as DIBAB, and is 0.015 mm thick. The control is effected with a voltage of 10 volts. The inside of the supporting plates 2 and 3 is provided in known manner with very fine parallel grooves, for example, by rubbing. The direction of the grooves in the supporting plate 2 is at right angles to that in the supporting plate 3. If there is no voltage between the electrodes 4 and 5, the molecules of the liquid crystal in a layer adjoining the supporting plates orient parallel to the grooves since the elastic deformation energy in the layer is then minimum. As a result of this a twisted configuration is formed in the layer of liquid crystal 1, the orientation of the molecules, proceeding through the thickness of the layer, varying gradually. Such a twisted configuration has the property of co-rotating the direction of polarisation of incident linearly polarized light with the twist. The linear polarisation of the light is then maintained when the direction of polarisation of the incident light is parallel to or at right angles to the orientation of the molecules on the side where the light is incident. In the device shown in the drawing the direction of polarisation is rotated through 90° in the unenergized condition and in the energized condition the light is passed without rotation of the direction of polarisation.

The plane of the drawing is assumed to be vertical. By means of a light source 6, a colour filter $F_1$ and a polarizer $P_1$, a beam R which consists of vertically polarized red light is thrown on the layer of liquid crystal 1. By means of a light source 7, a colour filter $F_2$ and a polarizer $P_2$, a beam G which consists of horizontally polarized green light is also thrown on the layer of liquid crystal 1. On the observation side of the device there is a polarizer, here referred to as an analyser A, which passes only vertically polarized light. Energized parts of the device, for example, in the form of a digit to be displayed, hence pass parts of the beam R. Unenergized parts of the device, the background of the digits to be displayed, pass parts of the beam G so that red digits appear on a green background. By rotating the analyser A through 90°, green digits are displayed on a red background. If desired, a frosted glass window may be arranged between the observer and the analyser A.

What is claimed is:

1. A device for displaying characters, comprising: a layer of nematic liquid crystal between two transparent supporting plates, said crystal in the undisturbed state having a twisted configuration and said supporting plates including electrodes arranged for creating electric field disturbing said twisted configuration according to a desired character; two light sources of linearly polarized light having different colors and directions of polarization which are at right angles to each other; and means for analyzing polarized light passed through said crystal.

* * * * *